US012304802B2

(12) United States Patent
Zhu et al.

(10) Patent No.: US 12,304,802 B2
(45) Date of Patent: May 20, 2025

(54) REFUELING GUN

(71) Applicant: CHONGQING LIDONG TECHNOLOGY CO., LTD, Chongqing (CN)

(72) Inventors: Zhongbing Zhu, Chongqing (CN); Guolin Lu, Chongqing (CN)

(73) Assignee: CHONGQING LIDONG TECHNOLOGY CO., LTD, Chongqing (CN)

( * ) Notice: Subject to any disclaimer, the term of this patent is extended or adjusted under 35 U.S.C. 154(b) by 0 days.

(21) Appl. No.: 18/432,305

(22) Filed: Feb. 5, 2024

(65) Prior Publication Data

US 2024/0174506 A1 May 30, 2024

Related U.S. Application Data

(63) Continuation of application No. PCT/CN2022/092224, filed on May 11, 2022.

(30) Foreign Application Priority Data

Aug. 6, 2021 (CN) ........................ 202110902624.2

(51) Int. Cl.

*B67D 7/42* (2010.01)
*B67D 7/36* (2010.01)
*B67D 7/60* (2010.01)

(52) U.S. Cl.

CPC ................ *B67D 7/42* (2013.01); *B67D 7/36* (2013.01); *B67D 7/60* (2013.01)

(58) Field of Classification Search

CPC ... B67D 7/32; B67D 7/36; B67D 7/42; B67D 7/48; B67D 7/50; B67D 7/60
See application file for complete search history.

(56) References Cited

U.S. PATENT DOCUMENTS

| | | | | |
|---|---|---|---|---|
| 7,422,039 B2 * | 9/2008 | Chisholm | B67D 7/04 | 239/525 |
| 7,814,941 B2 * | 10/2010 | Alex | B67D 7/42 | 141/26 |

* cited by examiner

*Primary Examiner* — Timothy L Maust
(74) *Attorney, Agent, or Firm* — Westbridge IP LLC

(57) ABSTRACT

A refueling gun comprises a housing, a valve rod, and a handle. A pump body is provided within the housing, the pump body is connected to an oil intake pipe and an oil outlet pipe, and a first check valve is provided within the oil intake pipe; an end portion of the valve rod located in the pump body is connected to a negative pressure generating assembly comprising a disk, a plurality of limiting members, and a sealing ring; the disk is fixedly connected to the end portion of the valve rod; the sealing ring is sleeved on the periphery of the plurality of limiting members, the sealing ring is slidingly connected to an inner wall of the pump body and is sealingly connected to the inner wall of the pump body; and the handle is rotatably provided on the housing and is connected to the valve rod.

9 Claims, 3 Drawing Sheets

REFUELING GUN

CROSS-REFERENCE TO RELATED APPLICATIONS

This application is a continuation of International Application No. PCT/CN2022/092224, filed on May 11, 2022, which claims priority to Chinese Patent Application No. 202110902624.2, filed on Aug. 6, 2021. All of the aforementioned applications are incorporated herein by reference in their entireties.

TECHNICAL FIELD

The present application relates to the field of refueling technologies, and in particular to, a refueling gun.

BACKGROUND

As shown in FIG. 4, in the prior art, a key part of a refueling gun includes a pump housing 23, an intake pipe 24 connected to the pump housing 23, an outlet pipe 25 connected to the pump housing 23, a top push rod 26 penetrating into the pump housing 23, and a squeezing disk 27 fixed to an end portion of the top push rod 26. The squeezing disk 27 is sealingly connected to an inner wall of the pump housing 23, the squeezing disk 27 can reciprocate with respect to the pump housing 23, a second check valve 28 is disposed in the outlet pipe 24, and a third check valve 29 is disposed on the squeezing disk 27.

The specific operating process is as follows: oil is first delivered from the intake pipe 24 only into the pump housing 23 under the unidirectional throttling effect of the second check valve 28. When the oil fills up the pump housing 23, the top push rod 26 pushes the squeezing disk 27, such that during movement, the squeezing disk 27 can squeeze the oil in the pump housing 23 into the outlet pipe 25 for discharging. The squeezing disk 27 is continuously pushed. When the squeezing disk 27 moves to a bottom close to the pump housing 23, a negative pressure chamber is formed in the pump housing 23, and the oil in the intake pipe 24 enters the pump housing 23. Then, the top push rod 26 is driven to carry the squeezing disk 27 to move towards the top of the pump housing 23. In this process, most of the oil in the pump housing 23 is squeezed, along with the movement of the squeezing disk 27, into the outlet pipe 25 for discharging. Moreover, part of the oil in the pump housing 23 is located between the squeezing disk 27 and the top of the pump housing 23. This part of the oil continuously moves towards the top of the pump housing 23 along with the squeezing disk 27. In this case, this part of oil is pressed spatially, resulting in an increase in the oil pressure. The part of the oil flows to the lower portion of the pump housing 23 via the third check valve 29, thus ensuring normal operation of the whole oil delivery process.

However, the foregoing manner shows an objective defect. In the prior art, the third check valve 29 is typically of a film structure. The film structure features a limited service life because it deforms and is damaged after opening and closing many times. Most importantly, the part of the oil between the top of the pump housing 23 and the squeezing disk 27 flows to the lower portion of the pump housing 23 via only one third check valve 29 at an excessively limited speed. As a result, it takes a long time to wait for the part of the oil to flow into the lower portion of the pump housing 23, causing a serious waste of time for refueling.

SUMMARY

For the shortcoming in the prior art, an objective of the present application is to provide a refueling gun used to resolve the technical problem, which is mentioned in the background, that the arrangement of the third check valve on the squeezing disk seriously affects the refueling time in the prior art.

A refueling gun is provided, including:

a housing, where a pump body is provided within the housing, the pump body is connected to an oil intake pipe and an oil outlet pipe, and a first check valve through which oil is delivered into the pump body is provided within the oil intake pipe;

a valve rod, where the valve rod penetrates into the pump body, an end portion of the valve rod located in the pump body is connected to a negative pressure generating assembly, the negative pressure generating assembly includes a disk, a plurality of limiting members that are fixed to the same side of the disk and that are distributed circumferentially, and a sealing ring, the disk is fixedly connected to an end portion of the valve rod, the plurality of limiting members and the valve rod are distributed on two sides of an axial direction of the disk, the sealing ring is sleeved on the periphery of the plurality of limiting members, the sealing ring is capable of reciprocating along the limiting member, a sliding direction of the sealing ring is perpendicular to a surface of the disk, the sealing ring is capable of sealingly abutting against the disk after sliding in the direction toward the disk, and the sealing ring is slidingly connected to an inner wall of the pump body and is sealingly connected to the inner wall of the pump body; and a handle, where the handle is rotatably provided on the housing and is connected to the valve rod by means of a connecting assembly so as to drive the valve rod to reciprocate within the pump body.

The operation principle is as follows.

The refueling personnel holds and rotates the handle, such that under action of the connecting assembly, the handle drives the valve rod to move towards the bottom of the pump body. In this case, the disk and the sealing ring move towards the bottom of the pump body. In this process, a friction force between the sealing ring and the inner wall of the pump body drives the sealing ring to relatively move towards the disk, thus enabling the sealing ring to abut against the disk for sealing connection therebetween. Moreover, as the sealing ring is always sealingly connected to the inner wall of the pump body, with the continuous movement of the disk and the sealing ring towards the bottom of the pump body, a negative pressure chamber is formed in the pump body.

Then, the oil in the oil intake pipe enters the negative pressure chamber of the pump body in a case of opening the first check valve, and then the first check valve is closed.

Next, the refueling personnel drives the handle to rotate in the opposite direction. In this case, under the action of the connecting assembly, the handle drives the valve rod to move towards the top of the pump body. At the same time, the valve rod drives the disk and the sealing ring to move towards the top of the pump body. In this process, the disk and the sealing ring squeeze the oil in the pump body to enter the oil outlet pipe for discharging, and the oil located between the top of the pump body and the disk exerts increasing pressure on the sealing ring. In this case, the sealing ring slides along a direction leaving the disk, and a gap starts to be present between the disk and the sealing ring. The oil located between the top portion of the pump body and the disk flows to the lower portion of the pump body through the gap. A refueling action is completed in this process, and the foregoing operation is repeated for continuous refueling operation.

The present application has the following beneficial effects.

In the present application, when the sealing ring and the disk move towards the bottom of the pump body, the sealing ring abuts against the disk and the two are sealing connected, such that the sealing ring and the disk continuously move towards the bottom of the pump body, enabling the formation of the negative pressure chamber in the pump body.

When the sealing ring and the disk move towards the top of the pump body, because the oil between the top of the pump body and the disk is continuously pressed, this part of oil pushes the sealing ring to slide along a direction leaving the disk, enabling a uniform gap to be present between the disk and the sealing ring, such that this part of the oil uniformly flows to the lower portion of the pump body through the gap.

This design manner replaces the check valve of a conventional film structure, allowing for more stable and longer use performance. In addition, this design manner can enable the oil between the top of the pump body and the disk to flow to the lower portion of the pump body through a larger and more uniform gap, thus improving the refueling efficiency.

DETAILED DESCRIPTION OF THE EMBODIMENTS

The technical solution in the present application is further described with reference to the accompanying drawings and embodiments.

Figure 1:
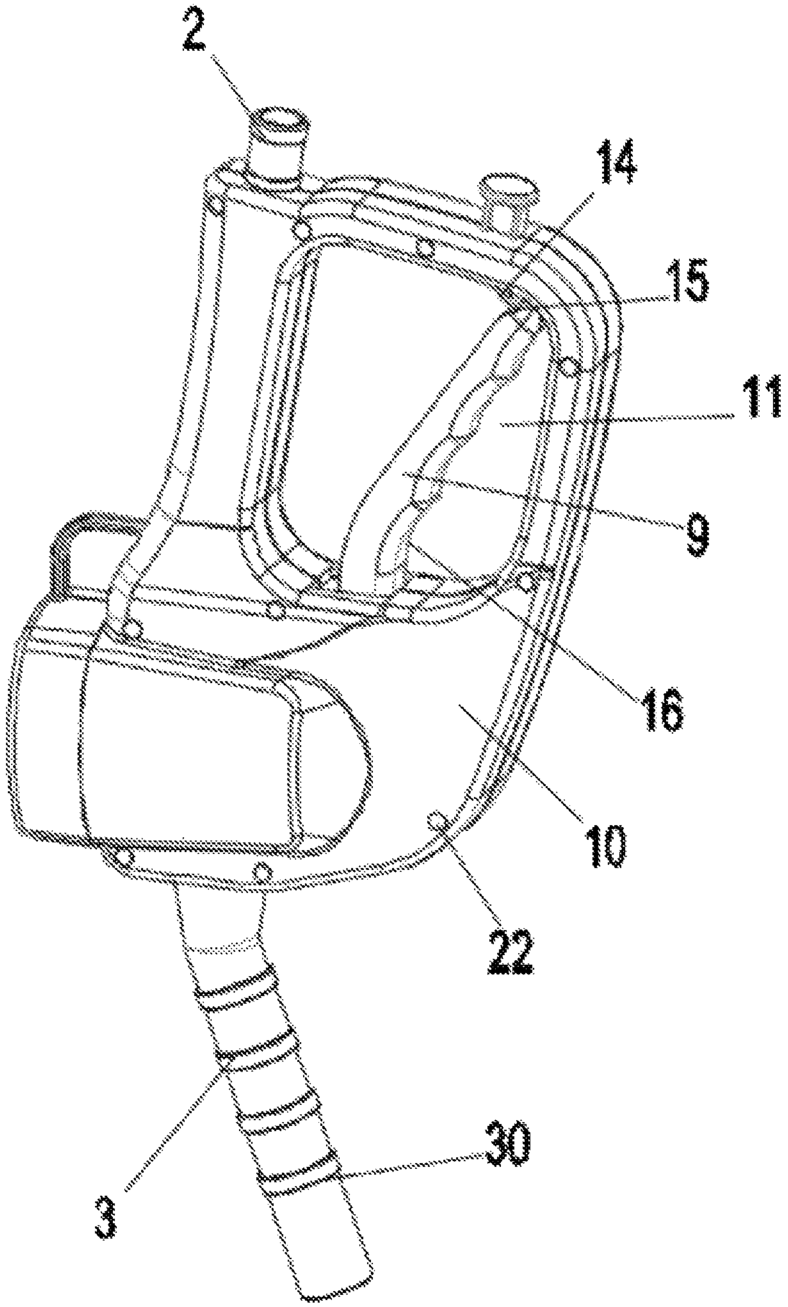
FIG. 1 is a schematic structural diagram according to an embodiment of the present application.
Figure 3:
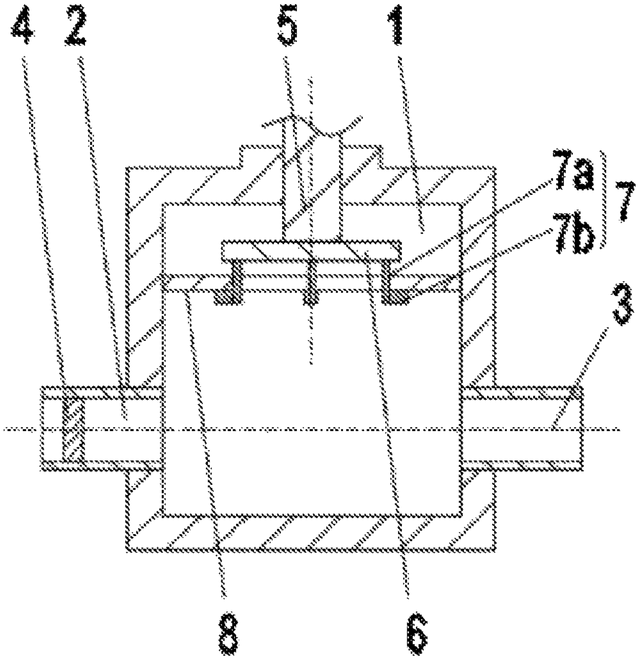
FIG. 3 is a schematic diagram of a pump body, a valve rod, a disk, and a sealing ring being assembled according to the present application.
Figure 4:
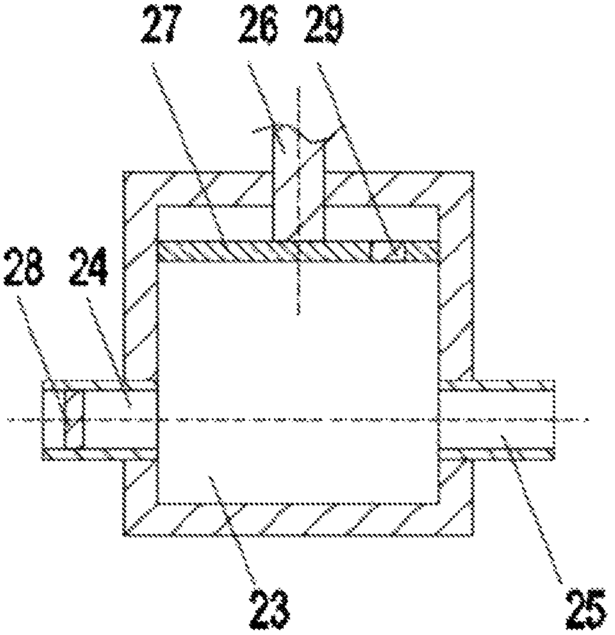
FIG. 4 (Prior Art)
FIG. 4 is a schematic structural diagram of the prior art.

As shown in FIGS. 1 and 3, a refueling gun is provided, including:

- a housing, where a pump body 1 is provided within the housing, the pump body 1 is connected to an oil intake pipe 2 and an oil outlet pipe 3, a first check valve 4 through which oil is delivered into the pump body 1 is provided within the oil intake pipe 2, a plurality of spaced protruding rings 30 are circumferentially fixed to an outer wall of the oil outlet pipe 3, and when the oil outlet pipe 3 is inserted into a refueling machine, the protruding rings 30 can prevent the refueling gun from falling off the refueling machine;
- a valve rod 5, where the valve rod 5 penetrates into the pump body 1, an end portion of the valve rod 5 located in the pump body 1 is connected to a negative pressure generating assembly, the negative pressure generating assembly includes a disk 6, a plurality of limiting members 7 that are fixed to the same side of the disk 6 and that are distributed circumferentially, and a sealing ring 8, the disk 6 is fixedly connected to an end portion of the valve rod 5, the plurality of limiting members 7 and the valve rod 5 are distributed on two sides of an axial direction of the disk 6, the sealing ring 8 is sleeved on the periphery of the plurality of limiting members 7, the sealing ring 8 is capable of reciprocating along the limiting member 7, a sliding direction of the sealing ring 8 is perpendicular to the surface of the disk 6, the sealing ring 8 is capable of sealingly abutting against the disk 6 after sliding in the direction toward the disk 6, the sealing ring 8 is slidingly connected to an inner wall of the pump body 1 and is sealingly connected to the inner wall of the pump body 1, the limiting member 7 is of a bending rod-shaped structure, the limiting member 7 includes a vertical section 7*a* perpendicular to a surface of the disk 6 and a horizontally extending section 7*b* that bends along a free end of the vertical section 7*a* and horizontally extends in a direction leaving a center of the disk 6, and the sealing ring 8 sleeves the vertical section 7*a*; and
- a handle 9, where the handle 9 is rotatably provided on the housing, the housing is fixed to a fixed shaft 20, the fixed shaft 20 penetrates through the handle 9, the handle 9 is rotatable around the fixed shaft 20, and the handle 9 is connected to the valve rod 5 by means of a connecting assembly so as to drive the valve rod 5 to reciprocate within the pump body 1.

Figure 2:
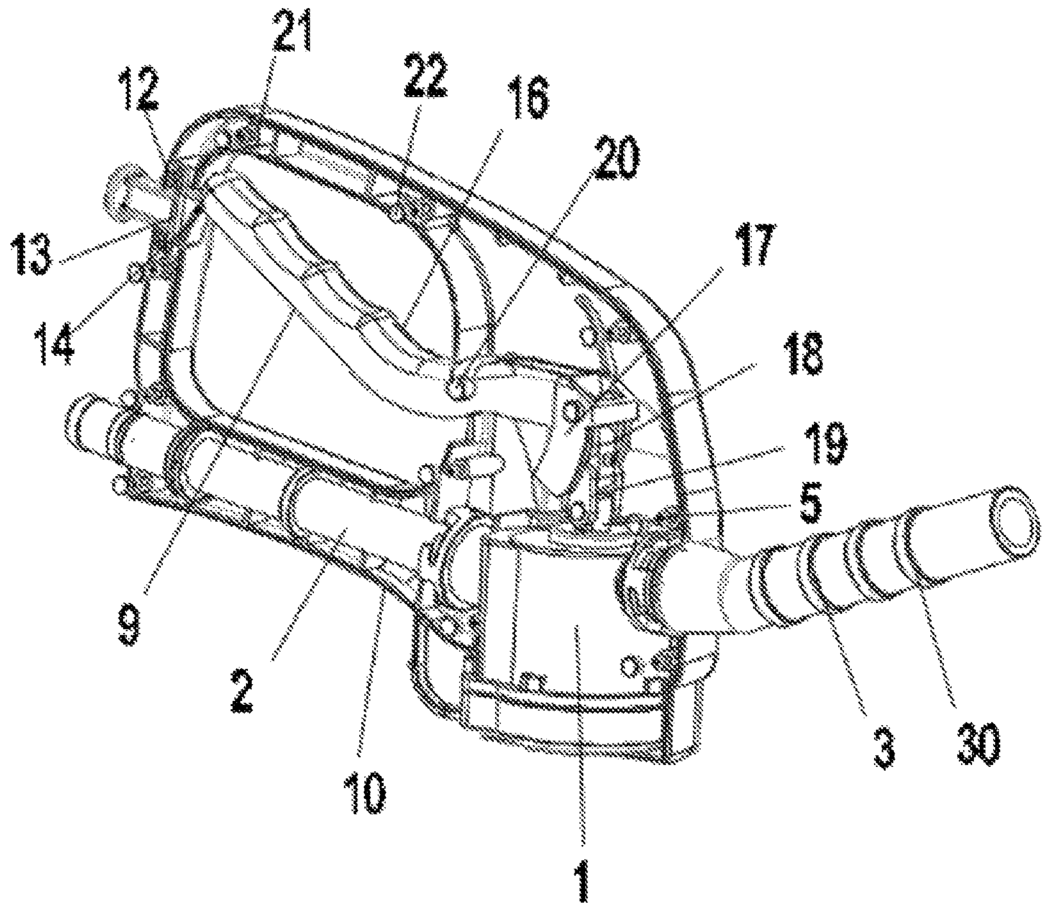
FIG. 2 is a schematic structural diagram after removal of a half housing according to the present application.

As shown in FIG. 2, the connecting assembly includes a first connecting block 17, a second connecting block 18, and a third connecting block 19, another end of the handle 9 away from the grip end is hinged with the first connecting block 17, the first connecting block 17 is hinged with the second connecting block 18, the second connecting block 18 is hinged with the third connecting block 19, the third connecting block 19 is hinged with the valve rod 5, and the first connecting block 17, the second connecting block 18, and the third connecting block 19 forms a hinged structure.

As shown in FIGS. 1 and 2, the housing includes two half housings 10, where the two half housings 10 are detachably spliced and fixed. One half housing 10 is fixed to, along its edge, a plurality of threaded tubes 21 with a thread on the inner wall, and the other half housing 10 is threadedly connected to, along its edge, a plurality of screws 22 that can be in one-to-one correspondence to the plurality of threaded tubes 21. The plurality of screws 22 are threadedly connected to the plurality of threaded tubes 21 in one-to-one correspondence. The housing is provided with a grip hole 11, and a grip end of the handle 9 is located in the grip hole 11. In this design manner, the refueling personnel can check the parts in the housing by disassembling the housing, facilitating check and repair.

As shown in FIGS. 1 and 2, the housing is provided with a locking assembly configured to relatively statically lock the handle 9 on the housing. After refueling, the refueling personnel can use the locking assembly to relatively statically lock the handle 9 on the housing, preventing rotation of the handle 9 from causing the oil to leak out during refueling. The locking assembly includes an elastic member 12, a blocking piece 13, and an abutting block 14 that are disposed in the housing, the blocking piece 13 is fixedly connected to an end portion of the elastic member 12, the abutting block 14 is fixedly connected to the blocking piece 13, a grip end of the handle 9 is provided with an abutting groove 15, and the abutting block 14 abuts against the abutting groove 15. This design manner allows for a simple structure of the locking assembly and convenient locking operation. A side surface of the abutting block 14 opposite the grip end of the handle 9 is an arcual inclined surface, and the grip end of the handle 9 is slidable along the inclined surface. Due to the continuous pushing effect of the elastic member 12 on the blocking piece 13 and the abutting block 14, the abutting block 14 may affect the rotation of the grip end of the handle 9. In this case, the side surface of the abutting block 14 is arranged as an arcual inclined surface. In the process of rotating the handle 9 by the refueling personnel, the grip end of the handle 9 slides along the arcual inclined surface, thus ensuring the normal rotation of the handle 9, and the elastic member 12 is of a spring structure. The grip end of the handle 9 is provided with a plurality of grip grooves 16. The fingers of the refueling personnel are placed in the grip groove 16, which is more convenient for the refueling personnel to grip and rotate the handle 9 with a force. The first check valve 4, the second check valve 28, and the third check valve 29 mentioned in the present application are all of the check valve structure in the prior art, and details are not described herein again.

The operation principle is as follows.

The refueling personnel grips the grip end of the handle 9 to rotate it, such that under action of the connecting assembly, the handle 9 drives the valve rod 5 to move towards the bottom of the pump body 1. In this case, the disk 6 and the sealing ring 8 move towards the bottom of the pump body 1. In this process, a friction force between the sealing ring 8 and the inner wall of the pump body 1 drives the sealing ring 8 to relatively move towards the disk 6, thus enabling the sealing ring 8 to abut against the disk 6 for sealing connection therebetween. Moreover, as the sealing ring 8 is always sealingly connected to the inner wall of the pump body 1, with the continuous movement of the disk 6 and the sealing ring 8 towards the bottom of the pump body 1, a negative pressure chamber is formed in the pump body 1.

Then, the oil in the oil intake pipe 2 enters the negative pressure chamber of the pump body 1 in a case of opening the first check valve 4, and then the first check valve 4 is closed.

Next, the refueling personnel drives the handle 9 to rotate in the opposite direction. In this case, under the action of the connecting assembly, the handle 9 drives the valve rod 5 to move towards the top of the pump body 1. At the same time, the valve rod 5 drives the disk 6 and the sealing ring 8 to move towards the top of the pump body 1. In this process, the disk 6 and the sealing ring 8 squeeze the oil in the pump body 1 to enter the oil outlet pipe 3 for discharging, and the oil located between the top of the pump body 1 and the disk 6 exerts increasing pressure on the sealing ring 8. In this case, the sealing ring 8 slides along a direction leaving the disk 6, and a gap starts to be present between the disk 6 and the sealing ring 8. The oil located between the top portion of the pump body 1 and the disk 6 flows to the lower portion of the pump body 1 through the gap. A refueling action is completed in this process, and the foregoing operation is repeated for continuous refueling operation.

At last, it is noted that the above embodiments are only used to illustrate the technical solution of the present application rather than to limit it. Although the present application has been described in detail with reference to the preferred embodiments, persons of ordinary skill in the art should understand that modifications or equivalent substitutions can be made to the technical solution of the present application without departing from the spirit and scope of the technical solution of the present application. All such modifications or equivalent substitutions should be included within the scope of the claims of the present application.

What is claimed is:

1. A refueling gun, comprising:

a housing, wherein a pump body is provided within the housing, the pump body is connected to an oil intake pipe and an oil outlet pipe, and a first check valve through which oil is delivered into the pump body is provided within the oil intake pipe;

a valve rod, wherein the valve rod penetrates into the pump body, an end portion of the valve rod located in the pump body is connected to a negative pressure generating assembly, the negative pressure generating assembly comprises a disk, a plurality of limiting members that are fixed to the same side of the disk and that are distributed circumferentially, and a sealing ring, the disk is fixedly connected to an end portion of the valve rod, the plurality of limiting members and the valve rod are distributed on two sides of an axial direction of the disk, the sealing ring is sleeved on the periphery of the plurality of limiting members, the sealing ring is capable of reciprocating along the limiting member, a sliding direction of the sealing ring is perpendicular to a surface of the disk, the sealing ring is capable of sealingly abutting against the disk after sliding in the direction toward the disk, and the sealing ring is slidingly connected to an inner wall of the pump body and is sealingly connected to the inner wall of the pump body; and a handle, wherein the handle is rotatably provided on the housing and is connected to the valve rod by means of a connecting assembly so as to drive the valve rod to reciprocate within the pump body.

2. The refueling gun according to claim 1, wherein the housing comprises two half housings, the two half housings are detachably spliced and fixed, a grip hole is provided in the housing, and a grip end of the handle is located in the grip hole.

3. The refueling gun according to claim 1, wherein the housing is provided with a locking assembly configured to relatively statically lock the handle on the housing.

4. The refueling gun according to claim 3, wherein the locking assembly comprises an elastic member, a blocking piece, and an abutting block that are disposed in the housing, the blocking piece is fixedly connected to an end portion of the elastic member, the abutting block is fixedly connected to the blocking piece, a grip end of the handle is provided with an abutting groove, and the abutting block abuts against the abutting groove.

5. The refueling gun according to claim 4, wherein a side surface of the abutting block opposite the grip end of the handle is an arcual inclined surface, and the grip end of the handle is slidable along the inclined surface.

6. The refueling gun according to claim 4, wherein the elastic member is of a spring structure.

7. The refueling gun according to claim 2, wherein the grip end of the handle is provided with a plurality of grip grooves.

8. The refueling gun according to claim 2, wherein the connecting assembly comprises a first connecting block, a second connecting block, and a third connecting block, another end of the handle away from the grip end is hinged with the first connecting block, the first connecting block is hinged with the second connecting block, the second connecting block is hinged with the third connecting block, and the third connecting block is hinged with the valve rod.

9. The refueling gun according to claim 1, wherein the limiting member comprises a vertical section perpendicular to the surface of the disk and a horizontally extending section that bends along a free end of the vertical section and horizontally extends in a direction leaving a center of the disk, and the sealing ring sleeves the vertical section.

* * * * *